H. H. HIGERT.
SHADE FOR AUTOMOBILE LIGHTS.
APPLICATION FILED NOV. 13, 1919.
1,403,496.
Patented Jan. 17, 1922.
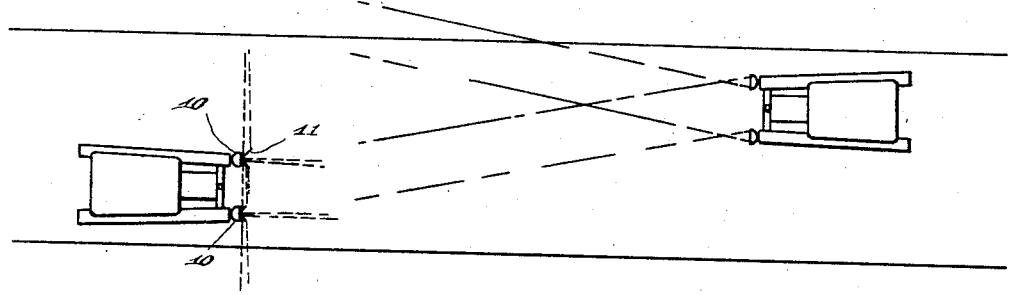
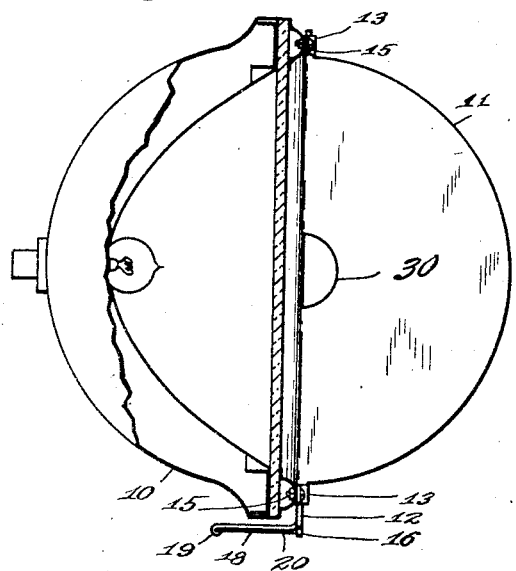
Inventor
Henry H. Higert,
By Hood & Schley
Attorneys

UNITED STATES PATENT OFFICE.

HENRY H. HIGERT, OF INDIANAPOLIS, INDIANA.

SHADE FOR AUTOMOBILE LIGHTS.

1,403,495.

Specification of Letters Patent. Patented Jan. 17, 1922.

Application filed November 13, 1919. Serial No. 337,789.

*To all whom it may concern:*

Be it known that I, HENRY H. HIGERT, a citizen of the United States, residing at Indianapolis, in the county of Marion and State of Indiana, have invented a new and useful Shade for Automobile Lights, of which the following is a specification.

The object of my invention is to provide an attachment or cooperative element for automobile head-lights, by means of which the driver may avoid any glare of light in the eyes of the driver of an approaching vehicle, and at the same time extra-illuminate both sides of the road for the convenience of himself and approaching driver, the device being of such character that, under normal conditions, the full strength of the light beams from the lamps will be thrown upon the road at any distance in front of the car for which the lamps may be set.

The accompanying drawings illustrate my invention. Fig. 1 is a diagrammatic plan of two approaching cars, one equipped with my improvement, and the other not so equipped; Fig. 2 an axial vertical section of a lamp equipped with my invention; Fig. 3 a front elevation; Fig. 4 a horizontal section; Fig. 5 a diagrammatic plan showing one arrangement by which the deflectors of both lamps may be simultaneously operated by pulling a single cord; and Fig. 6 an under plan of one pair of deflectors and operating arms.

In the drawings, 10 indicates the lamp or head-light of any ordinary form. For the purpose of abnormally deflecting the light rays horizontally without normally interfering with the passage of said rays to the roadway directly in front of the car, I provide two semi-circular deflectors 11, 11 supported at their adjacent edges by pivot shafts 12, 12 conveniently supported in ears 13 carried by the lamp body. These ears or supports may be of any suitable form and, in order that the device may be readily attached to existing lamps, I have shown them as small brackets, readily attached to the casing of the lamp body by bolts 15. Each shaft 12 is provided with an operating arm 16 and a spring 17 serves to normally hold the two deflectors in central position parallel with the axis of the lamp, the two cooperating deflectors of each lamp being held close together front to front.

Arranged adjacent each pair of shafts is an arm 18 carrying an eye or guide 19. Attached to one arm 16 is one end of an operating rope 20 which is carried thence through the adjacent guide; thence through a guide 22 in the end of arm 16 of the adjacent shaft 12; thence through guide 23 in the end of the nearest arm 16 of the companion lamp; thence through adjacent guide 19; thence through guide 24 of the other arm 16 of that lamp; and from thence to a point of convenient access by the driver.

The deflectors are so arranged relative to the light beam from the lamp that, when moved to divergent position, as indicated in Fig. 4, and at the right of Fig. 1, the rays will be horizontally deflected, some to the right and some to the left, so as to be deflected from the direct line of vision of the driver of an oncoming car and so as to thoroughly illuminate both sides of the road, as indicated in Figs. 1 and 4. The angle of displacement of the deflectors from normal position to obtain the desired result, is comparatively slight, but the capability of deflection may be sufficient to cause the deflectors to practically cover the lamp, thus rendering the device available for use in those cities having "dimming" ordinances. In such case, the deflectors may be provided with small notches 30 to produce a small light-emitting opening. The deflectors may be translucent, if desired.

I claim as my invention:

1. The combination, with a head-light, of a pair of deflectors pivotally supported and shiftable to a horizontally forwardly-divergent position such as to deflect portions of the light beam horizontally to opposite sides of the road, an operating arm connected to each deflector, a cable support adjacent the two arms and an operating cable attached to one arm and threaded through said cable support and then the other arm.

2. As an article of manufacture, a head-light attachment comprising a pair of deflectors pivotally supported and shiftable to a horizontally forwardly divergent position, such as to deflect portions of the light beam horizontally to opposite sides of the road, an operating arm connected to each deflector, a cable support adjacent the two arms, an operating cable attached to one arm and threaded through said cable support and then the other arm, and means for attaching the same to a head-light.

In witness whereof, I have hereunto set my hand at Indianapolis, Indiana, this 11th day of November, A. D. one thousand nine hundred and nineteen.

HENRY H. HIGERT.